United States Patent
Pedigo et al.

[15] 3,666,766
[45] May 30, 1972

[54] SELECTIVE HYDROLYSIS AND CYCLIZATION OF UNSATURATED NITRILES

[72] Inventors: Joel B. Pedigo, Wheaton, Ill.; Julian Feldman, Cincinnati; Imre A. Kereszies, Reading, both of Ohio

[73] Assignee: National Distillers and Chemical Corporation, New York, N.Y.

[22] Filed: Dec. 27, 1967

[21] Appl. No.: 693,735

[52] U.S. Cl. ............... 260/293.89, 260/465.8 R, 260/465.4, 260/239.3 A, 260/78 P
[51] Int. Cl. ........................................................ C07d 29/32
[58] Field of Search ............................. 260/294.7 F, 239.3

[56] References Cited

OTHER PUBLICATIONS

Chemische Berichte, Vol. 97 (7), page 1970, 1964, Korte et al.

*Primary Examiner*—Henry R. Jills
*Assistant Examiner*—S. D. Winters
*Attorney*—Allen A. Meyer, Jr.

[57] ABSTRACT

A process for selective catalytic hydrolysis and cyclization of unsaturated nitriles to the corresponding lactams, particularly conversion of 2-methylene glutaronitrile to 5-cyano-2-piperidone, the latter compound being claimed as a new composition of matter. 5-cyano-2-piperidone is especially useful for the preparation of polymers and resins such as carboxylated nylons, may be utilized to form polyamides and can be hydrolyized to an amino diacid which can form a linear polyamide useful, after hydrolysis, to adhere nylons and suitably grafted polyethylenes to hydroxyl-containing materials.

13 Claims, No Drawings

SELECTIVE HYDROLYSIS AND CYCLIZATION OF UNSATURATED NITRILES

This invention generally relates to a method in which an unsaturated mono or dinitrile is selectively hydrolyzed with cyclization in one step using as the catalyst a basic ion-exchange resin or a strong quaternary base such as trimethylbenzylammonium hydroxide (Triton B) either in the presence or absence of a basic or neutral solvent to form the corresponding lactam. The invention also pertains to the new compound 5-cyano-2-piperidone and a process for the production therefor.

In carrying out the process of this invention, the unsaturated mono or dinitrile, a stoichiometric or excess amount of water, and the catalyst are added to the basic solvent, the resultant mixture is agitated under elevated temperature and pressure for a suitable period of time, and the solid corresponding lactam is isolated. It is also possible to admix the unsaturated mono or dinitrile, a stoichiometric or excess amount of water, and the catalyst in the presence of or in the absence of the solvent. The resulting reaction mixture is agitated under elevated temperature and pressure, or at atmospheric pressure, for a period of time followed by the recovery of the solid lactam product.

The process of the invention is applicable to any unsaturated mono or dinitrile which is conjugated with an activating group such as a nitrile, carboxylic acid, amide, or ester group. The aliphatic mono or dinitrile may also be branched or substituted. The generic formula for the unsaturated nitrile starting materials which may be used can be expressed as set forth below:

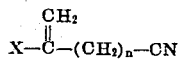

X may be another nitrile group (CN), a carboxylic acid group (COOH), an amide group (CONH$_2$), or an ester group (COOR) such compounds are useful because the activating group X is conjugated with the methylene group. The integer $n$ may be 1, 2, or 3 in the above formula, whereas R is a lower alkyl group having from one to six carbon atoms. Illustrative feed materials are:

2-methylene glutaronitrile
2-methylene-5-cyanovaleric acid
Itacononitrile

The unsaturated nitriles are readily obtainable by well-known reactions. For instance, 2-methylene glutaronitrile, the preferred starting material, may be prepared by dimerization of acrylonitrile according to published procedures.

A variety of basic ion-exchange resins may be employed as the catalyst in the process of this invention. Such ion-exchange resins are well known and standard procedures are employed for their preparation. Thus, for example, an ion-exchange resin in the chloride form of a polystyrene-divinylbenzene alkyl quaternary amine, such as those commercially available under the tradename "Rexyn," can readily be converted to the basic or hydroxyl form by percolating through the bed a solution of sodium hydroxide containing from 10 to 25 percent sodium hydroxide based on bed volume. The resulting basic ion-exchange resin can be effectively employed as the catalyst for the present purposes. Other useful basic ion-exchange resin catalysts include: cellulosic materials treated with such bases as triethylamine and diethylaminoethyl-, guanidoethyl-, and polyethylene imines, etc.; as well as polysaccharides such as dextran which have been similarly treated. Illustrative ion-exchange resins include those available under the tradename "Rexyn" (polystyrene-divinylbenzene copolymer treated with an alkyl quaternary amine); "Amberlite IRA-400" (chloromethylated polystyrene-divinylbenzene copolymer) as described in U.S. Pat. No. 2,591,573; "Sephadex" (cross-linked dextran); and the like. Other effective catalysts are the strong quaternary bases such as trimethylbenzylammonium hydroxide, trimethyl-n-propylammonium hydroxide, and the like.

In carrying out the method of this invention the ratio of the solvent to the nitrile or dinitrile undergoing reaction and water may range from the minimum necessary too maintain the nitrile and water in a homogeneous solution in the reaction mixture to a large excess of the solvent and preferably at a volume ratio of 0.5 : 1 to 10 : 1. A sufficient amount of solvent is generally employed to insure that the solid reaction products are soluble therein. The ratio of water to nitrile may range from the stoichiometric amount required for hydrolysis to several times stoichiometric, and preferably at a volume ratio of from about 0.15 : 1 to 2 : 1. The reaction temperature may range from about 60° to 200° C.; the preferable range is 110° to 150° C. The reaction pressure may range from atmospheric to superatmospheric, using air or an inert gas, in the range of about 0 to 10,000 psig., and preferably between 100 to 500 psig. The catalyst may be present in the range of about 0.1 to 50.0 percent by weight based on nitrile content; the preferred amount being about 10 to 20 percent. The time of reaction may also vary widely from about 2 to 200 hours and preferably from about 10 to 50 hours.

The organic solvents which may be employed in the process of this invention are either basic or neutral in nature, i.e., they have a pH of at least 7, and must provide substantial solubility for both the nitrile and water reactants. Typical solvents meeting these requirements include pyridine, 3-picoline, 2-picoline, 4-picoline, pyrrole, quinoline, isoquinoline, indole, glycol ethers, and diethers, dimethyl sulfoxide, sulfolane, dibutylformamide, N-dimethylformamide and the like as well as mixtures thereof. Preferred solvents are pyridine and ethylene glycol monomethyl ether.

The exact mechanism of the reaction or reactions taking place during the process of this invention are not fully understood at this time. One possible explanation is that there is selective catalytic hydrolysis of the nitrile group followed by reaction between the lone pair of electrons on the nitrogen of the unsaturated monoamide and the pi electrons of the methylene bond via the Michael Addition to form the desired lactam product. Another possibility involves an hydroxyl attach on the carbon atom of the nitrile group to form an intermediate which then cyclizes to form the lactam product. It will be understood, however, that the above explanations are not intended to limit the present invention to these or any other possible mechanisms.

In accordance with the most preferred method of the invention, 2-methylene glutaronitrile is selectively hydrolyzed and cyclized to 5-cyano-2-piperidone. The process is carried out by adding the unsaturated nitrile, either a stoichiometric or an excess amount of water, and a catalyst comprising a basic ion-exchange resin or a strong base such as trimethylbenzylammonium hydroxide to a basic solvent, agitating this mixture at elevated temperature and elevated pressure for a period of time, and then isolating the solid 5-cyano-2-piperidone product from the reaction mixture.

This new process for lactams and products made by this invention find extensive use in connection with chemical intermediates and otherwise, the 5-cyano-2-piperidone being especially useful for the preparation of polymers and resins such as the carboxylated nylons.

Under suitable reaction conditions, the 5-cyano-2-piperidone forms polyamides which may well have greater dimensional stability in the presence of water than nylons derived from caprolactam. Another utilization of the new lactam involves its hydrolysis to an amino diacid, i.e., 2-aminomethyl glutaric acid, which form linear polyimides containing repeating six-membered cyclic rings. This polymer is then hydrolyzed to form carboxylated polyamides, which can be used to give adherence of nylons and suitably grafted polyethylenes to hydroxyl-containing materials. During the hydrolysis either imide bond may open giving, in one case, a propionic acid substituted polyamide and, in the other case, a carboxylic substituted polyamide. Mixtures of both polyamides generally result from the hydrolysis treatment.

The invention will be more fully understood by reference to the following illustrative embodiments.

EXAMPLE 1

10.0 Grams of an ion-exchange resin catalyst (alkali treated Rexyn) 60 cc. of 2-methylene glutaronitrile, 50 cc. of pyridine, and 18 cc. of water were placed in an 250 ml. agitated pressure reactor. The reactor was closed and brought to a pressure of 200 psig. with nitrogen. The reaction mixture was stirred and heated at 140° C. for 196 hours. The reaction vessel was opened and the reaction mixture was then filtered to remove the catalyst. The resulting filtrate was distilled to remove pyridine and excess water. After isolation of the product by crystallization and recrystallization from methanol and acetonitrile it was found to be 5-cyano-2-piperidone, having a melting point of 141°–142° C., as indicated by the following data. Elemental analysis: %C–57.91, 57.83; %H–6.46, 6.52; %O–13.22, 13.07; and %N–22.39. Theoretical is %C–58; %H–6.5; %O–12.9; and %N–22.4. Infrared analysis $\diagdown$NH–3.0 mononitrile–4.2 and amidic carbonyl–6.05. Mass spectral analysis gave major peak at M/e–30, 42, and 124. The molecular peak was M/e 124. Infrared spectrum analysis confirmed the structure of the 5-cyano-2-piperidone. The conversion of 2-methylene glutaronitrile was 83 percent, and the yield of 5-cyano-2-piperidone was 80 percent.

EXAMPLE 2

10.0 grams of an ion-exchange resin catalyst (alkali treated Rexyn), 50 cc. of 2-methylene glutaronitrile, 18 cc. of water, and 250 cc. of 3-picoline were placed in a 500 ml. flask, stirred, and heated at 108° C. for 108 hours at atmospheric pressure. The product was isolated as described in Example 1. This gave a conversion of 36 percent and a 30 percent yield of 5-cyano-2-piperidone.

EXAMPLE 3

51 grams of 2-methylene glutaronitrile, 78 grams of pyridine and 27 grams of water were heated in a Stainless Steel autoclave at 140° C. with 4 grams of 35 percent solution of trimethylbenzylammonium hydroxide (Triton B) for 60 hours under autogenous pressure with stirring. 81 percent of the 2-methylene glutaronitrile was converted to give a yield of 50 percent of cyano lactam as determined by G. L. C. After distilling most of the volatiles, the lactam was extracted from an aqueous solution by ether. The crude material was sublimed in vacuo and recrystallized from acetone.

EXAMPLE 4

51 grams of 2-methylene glutaronitrile, 102 grams pyridine and 25.5 grams water, 4 grams of trimethylbenzylammonium hydroxide (Triton B) (30 percent in methanol) were heated at 150° C. for 22 hours in an autoclave. After distilling off solvent the residue was refluxed with chloroform (2 × its volume) and filtered. The chloroform solution was concentrated and extracted with water. This operation transferred the lactam to the aqueous phase. The water extract was concentrated and then exhaustively and continuously extracted with chloroform. On evaporation of the chloroform crude crystals deposited which were recrystallized from acetone and from chlorobenzene, m. p. 141°–142° C.

While the process of this invention has been described above with respect to certain preferred embodiments, it will be understood that the invention may be subject to modifications and variations without departing from its broader concepts.

What is claimed is:

1. A process for the preparation of 5-cyano-2-piperidone by the hydrolysis and cyclization of 2-methylene glutaronitrile which comprises the steps of reacting said nitrile with at least a stoichiometric amount of water and a basic ion-exchange resin or a strong quaternary ammonium salt catalyst at elevated temperatures and at pressures above 0 psig.

2. The process of claim 1 in which the reaction is carried out at a temperature of about 60° to 200° C. and at a pressure of about atmospheric to 10,000 psig.

3. The process of claim 1 in which an excess of water is present together with an organic solvent having a pH at least 7.

4. The process of claim 3 in which the organic solvent is a neutral solvent.

5. The process of claim 3 in which the organic solvent is basic.

6. The process of claim 1 wherein said catalyst is polystyrenedivinylbenzene alkyl quaternary amine.

7. The process of claim 1 wherein said catalyst is trimethylbenzylammonium hydroxide.

8. The process of claim 1 in which the reaction is carried out in the presence of an excess of water, and at temperatures between 110° C. and 150° C. and pressures of 100 to 500 psig.

9. The process of claim 1 in which an organic solvent having a pH of at least 7 is present.

10. The process of claim 1 wherein said catalyst is a basic ion-exchange resin.

11. The process of claim 1 wherein said catalyst is a strong quaternary ammonium salt.

12. The process of claim 4 wherein the ratio of solvent to nitrile is within the range of from about 0.5:1 to about 10:1, by volume.

13. The process of claim 1 wherein the ratio water to nitrile is within the range of from about 0.15:1 to about 2:1, by volume.

* * * * *